United States Patent Office 3,049,742
Patented Aug. 21, 1962

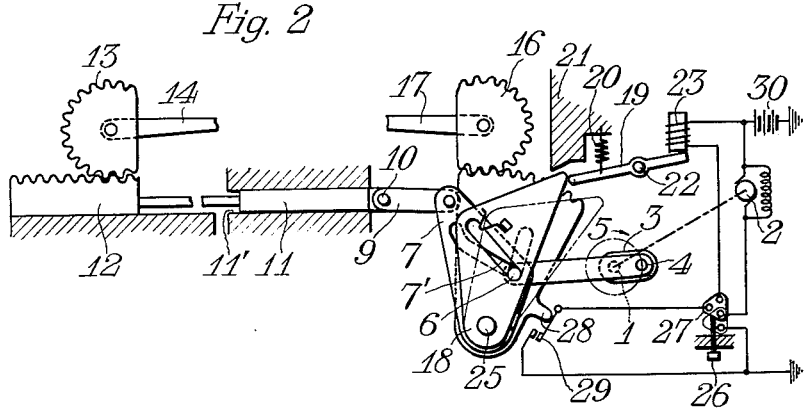
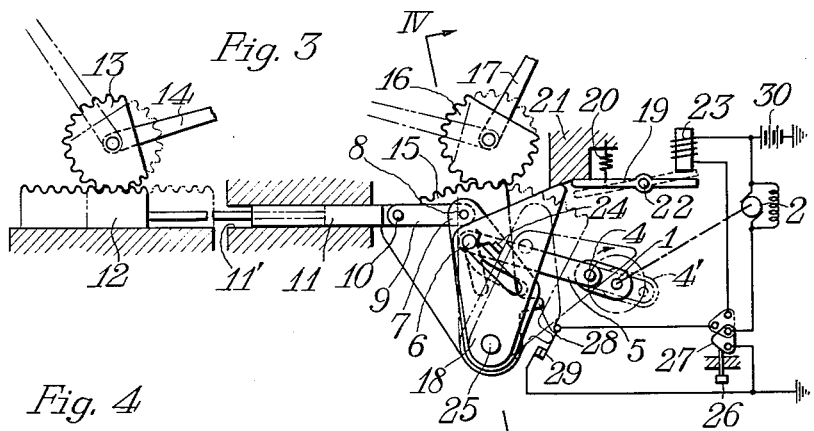
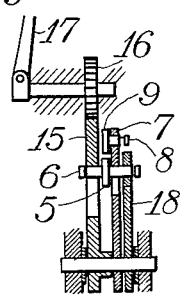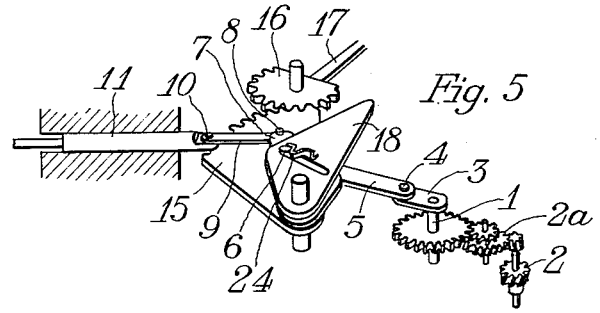

3,049,742
SYSTEM FOR DRIVING WINDOW WIPERS
FOR A VEHICLE
Masumi Kato, Toyoakecho, and Shigeyoshi Kamimura, Okazaki, Japan, assignors to Toyota Motor Co., Ltd., Toyota, Japan, a corporation of Japan
Filed Dec. 14, 1960, Ser. No. 75,716
Claims priority, application Japan Dec. 14, 1959
2 Claims. (Cl. 15—250.17)

This invention relates to a system for driving wipers for a vehicle and more particularly for a motor vehicle, comprising means ensuring that an operator has the satisfactory visibility in rainy days.

Any conventional wiper device for a motor vehicle includes usually a pair of wiper elements adapted to be rocked in parallel relationship or in opposed relationship with each other. The former wiper elements can not wipe up that portion of a front window sheet glass remote away from an operator seat, while the latter can not wipe up the central portion of the front window sheet glass. Also any variation in loading of the wiper element due to climatic change causes the same to beat a lower side of a window frame carrying the window sheet glass whereby a body of rubber material forming a wiper blade is adversely affected resulting in deformation, abrasion and the like.

An object of the invention is to avoid the above-mentioned disadvantages by providing a system for driving a pair of wiper elements to effect special movement. The invention is characterized in that one of a pair of wiper elements mounted to a pair of laterally spaced holders respectively is first started to be swivelled on a front window sheet glass to a relatively large extent until the free end of the one wiper element reaches substantially its uppermost position whereupon the other wiper element is started to be swivelled from its stored position. Thus, when one of the wiper elements has its free end substantially at the uppermost position the other element has its free end substantially at the lowermost position. Both the wiper elements begin to effect interlocking swivelling movement from such positions different from each other by substantially half a period of swivelling or rocking movement and continue this movement without both elements interfering with each other. Upon effecting stopping operation, one of the wiper elements begins to effect stopping movement from its lower position while the other element begins to effect stopping movement from its upper position lagging behind the former position by half the period of the rocking movement until both elements will be stopped in superposed relationship.

Therefore, the invention gives remarkable results that a substantial area of a window sheet glass for a vehicle involving the central portion thereof can be satisfactorily wiped up though it would be curved, a variation in torque of a motor for driving a wiper device is reduced, and a change in angular velocity of wiper element due to its inertia force is balanced out and so on.

Another object of the invention is to provide an improved system for driving wiper elements in which the elements are adapted to be stored in a predetermined portion of a window frame which does not obstruct the field of vision and operable to wipe up the necessary area of a window sheet glass without beating the window frame even if the same would have a low wiping friction.

The invention itself as to the nature and the mode of operation together with additional objects and advantages thereof will best be understood from the following description of a specific embodiment when read in conjunction with the accompanying drawings, in which:

FIG. 2 shows schematically a plan view of a wiper drive embodying the teaching of the invention and in its inoperating condition together with a diagram of an electric circuit associated therewith;

FIG. 3 shows a view similar to FIG. 2 illustrating the wiper drive in its operating condition;

FIG. 4 shows a section taken along the line IV—IV of FIG. 3; and

FIG. 5 shows a perspective view of the essential parts of the wiper drive illustrated in FIGS. 2 and 3.

Figure 1:
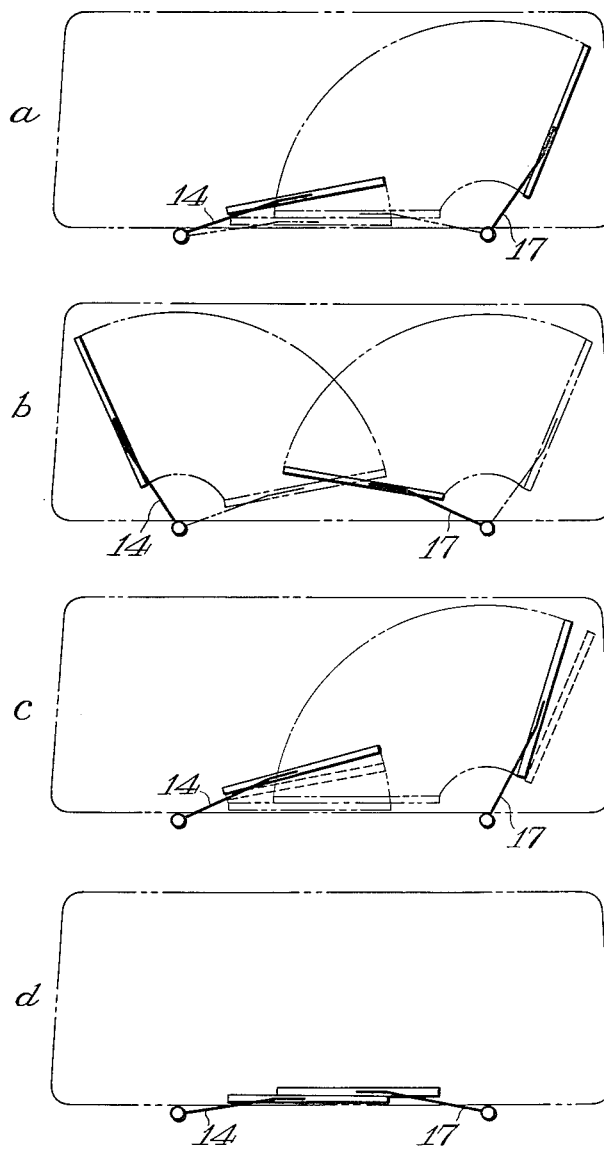
FIGS. 1a through 1c show a pair of wiper elements being driven in accordance with the teaching of the invention.
FIG. 1d shows the wiper elements shown in FIGS. 1a through 1c stored in their inoperating positions.

Referring now to the drawings, FIGS. 2 and 3 illustrate a wiper drive device constructed according to the teaching of the invention. A motor 2 for driving the wiper device includes a driving shaft 1 adapted to be rotated at a suitable speed by the same through a suitable reduction gearing 2a. As best shown in FIG. 5, the driving shaft 1 has its free end portion provided with an arm 3 which, in turn carries a pin 4 at its end. The driving shaft 1, the arm 3 and the pin 4 are constructed and arranged such that they are rigidly secured to each other whereby a torque is transferred from the driving shaft to the pin. The pin 4 has an extension including a pivoted rod 5 at one end. At the other end the rod 5 carries a pin 6 secured thereto and projecting beyond ends of the same. The pin 6 is in engagement with an elongated slot formed on each of an operating lever 7, a cam plate 18 and a toothed sector 15 for movement. The reciprocal movement of the pin 6 permits each slot to be rocked about an axis of a stud 25 which is a part of the toothed sector 15 and which is supported in a bearing (not shown).

The operating lever 7 including one of the above-mentioned slots is pivoted to the stud 25 and has its end portion provided with an aperture into which a pin 8 is loosely fitted. The pin 8 is rigidly secured to and supported by a rod 9 having its end pivoted to a rod 11 by means of a pin 10. The rod 11 is disposed in a guide groove 11' for reciprocal movement and includes secured thereto a rack 12 which, in turn meshes with a pinion 13. The pinion 13 is provided at its center with a wiper arm 14 secured thereto. The arm carries a wiper element.

The toothed sector 15 including one of the slots through which the pin 6 extends includes the stud 25 integral with the same and carried by a bearing (not shown) and has a toothed peripheral portion meshing with a pinion 16 which, in turn is provided at the center with a wiper arm 17 secured thereto. The arm carries another wiper element. The sector also is provided with a projection 28 on the righthand edge as viewed in FIGS. 2 and 3.

The cam plate 18 including also one of the slots through which the pin 6 extends is provided with a leaf spring 24 adjacent to one end of the slot which is illustrated as being remote from the stud 25 and which is referred to hereinafter as an outer end. The leaf spring 24 serves to apply to the pin 6 a pressure sufficient to prevent the same from being readily displaced within the slot when the pin is at the outer end of the slot. Further the cam plate 18 includes a relatively pointed righthand end portion (as viewed in FIGS. 2 and 3) such that it can engage a control lever 19 normally biased by the action of a spring 20 so as to contact one end of the lever with a stopper 21 but not with the cam plate 18 unless the motor 2 is deenergized. As also shown in FIG. 3 the stopper 21 has its end portion formed in such profile that the relatively pointed end portion of the cam plate 18 can contact with the end portion of the stopper only at the end of its operating range. Namely the profile is such that it does not interfere with the operation of the cam plate.

The control lever 19 includes a pin 22 intermediate the ends and is arranged to be rotatable about the pin 22 in the counterclockwise direction as viewed in the drawings, by means of an energized magnet coil 23 and against the action of the spring 20 until the end of the lever 19 abuts against the relatively pointed end portion of the cam plate 18 to stop the latter as shown in FIG. 2.

FIGS. 2 and 3 illustrate also a schematic diagram of an electric circuit suitable to be associated with the device above described. The electric circuit includes a pushbutton switch 26 adapted to actuate a triangular conductor 27 serving to close and open the circuits of the motor 2 and the magnet coil 23, and contacts 29 controlled by the projection 28 of the toothed sector 15 to deenergize the motor 2 after the wiper elements have been brought in their stored positions. The junction of the magnet coil 23 and the motor 2 is connected to one terminal of a battery 30, the other terminal of which is grounded.

The wiper driving device thus far described will be operated as follows:

With the device in its inoperating state as illustrated in FIG. 2, the pushbutton 26 is operated to displace the triangular conductor 27 to a position shown at dot-and-dash line in FIG. 2. This completes a circuit for energizing the motor 2, and a current flows from the battery through the motor, and contacts now closed by the triangular conductor 27 back to the battery to thereby rotate the motor 2. This rotation of the motor causes the rotation of the driving shaft 1 through the reduction gearing 2a at any suitable speed. Accordingly, the pin 4 secured to the end of the arm 3 rigidly secured to the shaft 1 is rotated about the said shaft 1. Thereby the rod 5 engaging the pin 4 is pushed toward the cam plate 18 with the other end of the rod 5 pushing the pin 6 in the same direction. Since the latter pin 6 engages the elongated slots formed on the cam plate 18, the operating lever 7 and the toothed sector 15 respectively the same will push the internal wall of each slot to rotate the members 18, 7 and 15 about the axis 25. However, as shown in FIG. 2, the outer end of the cam plate 18 faces the stopper 21 with a small spacing formed therebetween. This permits the cam plate 18 to be slightly moved to disengage from the control lever 19 still deenergized resulting in the movement of the lever 19 toward the stopper 21 by the action of the spring 20. As the lever 19 is in a position shown in FIG. 2, it abuts against and is stopped by the stopper 21.

On the other hand, the motor is continued to be rotated so that the pin 6 slides within the slot on the cam plate 18 until it reaches the other end of the slot. At an instant the arm 3 has been rotated through substantially 180° to sufficiently push the rod 5, the pin 6 reaches the outer end of the associated slot. During the movement of the pin 6, the leaf spring 24 disengage once from the pin because of its elastic deformation due to the pushing force of the pin and, after the pin 6 has reached the outer end of the associated slot, the spring 24 returns back to its normal state in which the latter applies to the pin 6 a relatively small force to prevent the pin 6 from rattling and also from returning back to its initial position.

After the pin 6 has displaced from one end to the other in the slot on the cam plate as just above described, the toothed sector 15 is caused to be rotated about the axis 25 because of the engagement of the pin 6 with the slot on the same. During this rotation of the sector the cam plate 18 can not be moved and accordingly the slot on the cam plate guides the pin 6 to slide within the slot on the toothed sector until it will reach the outer end thereof.

This movement of the pin 6 relative to the toothed section 15 results in large angular movement of the toothed sector 15 from its position shown in FIG. 2 to its new position shown in FIG. 3 because that slot is positioned substantially radially to the axis 25. This rotation of the toothed sector 15 causes the pinion 16 meshing with the outer peripheral toothed portion thereof to be rotated in the reverse direction or the clockwise direction as viewed in the drawings to thereby move the wiper arm 17 secured to the pinion 16 from its position shown in FIG. 2 to its position shown at full line in FIG. 3. Thus the associated wiper element is moved to a righthand position shown at full line in FIG. 1a illustrating the wiper elements in a condition of starting its operation.

Further, the pin 6 engages the slot in the control lever 7 as previously described. Therefore, simultaneously with each of the movements just above explained, the pin 6 is guided by the slot in the cam plate 18 to be moved to the outer end of the slot in the lever as in the case of the toothed sector 15. As above explained; the pin 6 is moved in the slot in the sector 15 to effect a pushing action whereas the same is moved in the slot in the control lever 7 to effect a wedging action because a space 7' common to the slots on both the cam plate 18 and the control lever 7 is V-shaped as seen in FIG. 2. Therefore, the lever 7 is pulled toward the cam plate 18 which is now stationary. In other words, the operating lever 7 is moved from its position shown in FIG. 2 to a position in which the same is superposed on the cam plate as shown in FIG. 3. This movement of the operating lever 7 is transferred through the rod 9 and the rod 11 to the rack 12. Then the rack is pulled toward the lever 7 to rotate the pinion 13 meshing with the rack to thereby move the wiper arm 14 secured to the pinion 13 from its position shown in FIG. 2 to its position shown in full line in FIG. 3. Therefore, the corresponding wiper element is raised from its stored position shown in FIG. 1a to the position shown at the lefthand full line in the same.

Also, the angular movement of the toothed sector 15 closes the contacts 29 in the electric circuit by displacing the projection 28 of the same from its position shown at full line in FIG. 2 to its position shown at full line in FIG. 3. Thus the wiper device has been placed in the condition shown at full line in FIGS. 1a and FIG. 3.

The operation of the device thus far described is effected during a half revolution of the arm 3. The succeeding half revolution of the arm tends to reset the device to its original condition. More specifically, the arm 3 is rotated in the direction of the arrow during the succeeding half revolution thereof and a force tending to move the pin 4 from a position designated at full line to a position shown at dot-and-dash line in FIG. 2 is applied to the rod 5 to thereby push the pin 6 toward the driving shaft 1. The pin 6 is now positioned at the outer end of each of the slots but tends to return back to its original position in the slots in the toothed sector 15 and the lever 7 due to a resistance occurring during the wiping movement of the wiper elements. However, each of the slots is shaped such that its outer end portion has a periphery in the form of circular arc about the axis 25 to thereby make that component of the force serving to restore the pin 6 smaller and simultaneously to make that component of the force serving to rotate both the toothed sector 15 and the operating lever 7 larger. Therefore, by suitably selecting a force with which the leaf spring 24 holds the pin 6, the cam plate 18, and the operating lever 7 and the toothed sector 15 as one unit can be rotated about the axis 25 to be pulled toward the driving shaft 1. Thus it will be seen that, if the pin 6 is pulled toward the driving shaft 1 all the cam plate 18, the operating lever 7 and the toothed sector 15 are also rotated about the axis 25 to be pulled toward the shaft 1. Also it will be seen that, at a time the pin 4 has been moved to a position 4' shown at dotted-and-dashed line in FIG. 3 to thereby complete pulling of the pin 6, the associated members are operated to their respective positions designated also at dot-and-dash line in FIG. 3. This permits the rack 12 to be moved to a position shown at dot-and-dash line in FIG. 3 by means of the operating lever 7, the pin 8, the rod 9, the pin 10 and the rod 11 until the pinion 13 and hence the wiper arm 14 is rotated to their positions designated at dot-and-dash line in FIG. 3 respectively. Thus the correspond wiper element is placed in its position shown at lefthand full line in FIG. 1b illustrating the wiper elements in their operating condition.

Also the pinion 16 meshing with the toothed sector 15 and the wiper arm 17 secured to the pinion 16 are rotated up to their respective positions shown at dot-and-dash line in FIG. 3. However, they are not moved up to positions corresponding to the position of the wiper arm 17 shown in FIG. 2. This results from the fact that, as shown in FIG. 2 a distance between the slots on the toothed sector 15 and the driving shaft 1 is progressively somewhat smaller from the inner end to the outer end of the slot so that the toothed sector 15 is further remote away from the driving shaft 1 in the case of the pin 6 engaging the outer end of the slot than in the case of the same engaging the inner end thereof when the rod 5 is nearest to the driving shaft 1. This permits the wiper arm 17 to be driven to its position shown at dot-and-dash line in FIG. 3 but not to its stored position. Therefore, the corresponding wiper element is positioned as shown at righthand full line in FIG. 1b.

On the other hand, the projection 28 of the toothed sector 15 is operated to its position shown at dot-and-dash line in FIG. 3 but not to its position shown in FIG. 2 resulting in the impossibility of opening the contacts 29.

Thus the device is put in its condition shown at full line in FIG. 1b and shown at dot-and-dash line in FIG. 3.

During the succeeding half revolution of the arm 3, the operation is effected in just the reverse manner and at the end of thereof the device is put in its condition shown at dot-and-dash line in FIG. 1b and shown at full line in FIG. 3. Thus it is to be understood that, as long as the switch is maintained closed, the wiper arms and hence the wiper elements are continued to be rocked between the position shown at full line in FIG. 1b and the position shown at dot-and-dash line in the same whereby the wiper elements are continued to wipe up a substantial surface of a front window. Therefore, it can be seen from FIG. 1b that the wiper elements do not beat the window frame and are prevented from damages such as deformation, abrasion, etc. It will be also understood that the electric circuit is maintained in the condition shown in FIG. 3 remaining unchanged with no movement of storing the wiper elements and with the contacts 29 remaining closed.

The operation for stopping the rocking movement of the wiper elements will now be described.

With the wiper elements continued to effect wiping movement with the range shown in FIG. 1b, this movement can be stopped by pushing the pushbutton 26 upwardly as viewed in FIG. 3 to drive the triangular conductor 27 to its position shown at dotted line in FIG. 3. Then that terminal of the motor 2 directly grounded by the conductor is grounded through the contacts 29, whereby the motor is continued to be rotated.

At the same time, that end of the magnet coil 23 remote from the junction of the same and the motor 2 is also grounded through the contacts 29. This causes energization of the magnet coil 23 which, in turn will attract that end portion of the control lever 19 facing the same to rotate the lever 19 about the fulcrum 23 and against the action of the spring 20 to thereby bring the lever into a position shown at dotted line in FIG. 3.

In this case, it is assumed that the cam plate 18 is in a position other than the position shown at full line in FIG. 2. The control lever 19 thus driven will then contact the cam plate 18 as approaching its position shown at full line in FIG. 2. As the energized coil 23 has only a low attracting force just sufficient to overcome the force of the spring 20, the same provides no resistance enough to stop the cam plate being driven by the motor and only slides along the cam plate while the portion of the latter contacting the lever is pushed toward the full line position shown in FIG. 3. At an instant the lever has reached the full line position the same returns back to the dotted line position.

With the cam plate in its position shown at full line in FIG. 3, it is understood that the displacement of the triangular conductor 27 causes the lever 19 to be directly brought into the position shown at dotted line in FIG. 3. Such change in position does not affect the electric circuit so that the cam plate is continued to be rocked. Therefore, the relatively pointed portion of the cam plate will abut against the end of the lever 19 at a position in which the cam plate is somewhat displaced from the full line position toward the driving shaft 1 whereby the same is prevented from movement. Accordingly the pair of wiper elements occupy their positions shown at full line in FIG. 1a. However, the rotation of the motor 2 causes the pin 6 to be moved toward the inner end of the slot on the cam plate 18. During this movement the pin 6 is to raise the leaf spring 23 and then be moved. However, the slot on the cam plate is now disposed obliquely to a radius passing through the axis 25 but not along such a radius. This permits the torque of the motor to readily move the pin 6 in the slot. Thus the pin 6 will reach the inner end of the slot at the moment the arm 3 has further rotated through approximately 180° to provide the maximum pulling force as shown in FIG. 2. Since the pin 6 engages also slot in each of the operating lever 7 and the toothed sector 15 as previously described, the slot in the cam plate now stationary serves as a guide for displacing the pin 6 toward the inner end of the slot on each of the members 7 and 15. When the pin 6 reaches the inner ends of the latter slots the outer end of the slot in the lever 7 is farther remote from the driving shaft 1 than that on the cam plate 18 as shown at full line in FIG. 2 and accordingly the operating lever 7 is moved from its position shown at full line in FIG. 3 to its position shown at full line in FIG. 2. Therefore, the wiper element associated with the lever 7 is stored at a position shown at lefthand dotted line in FIG. 1c illustrating the pair of wiper elements in a condition of initiating to stop the same.

On the other hand, as shown in FIG. 2, the outer end of the slot on the toothed sector 15 is very separated from that on the cam plate 18. The pinion 16 and hence the wiper arm 17 can be moved from their positions shown at full line in FIG. 3 to those shown at full line in FIG. 2. It is noted that, in this case the wiper arm 17 goes over the position shown at dot-and-dash line in FIG. 3 to that shown at full line in the same. This result from the fact that the slot in the toothed sector is formed such that a distance between the same and the driving shaft 1 is progressively greater from the inner end toward the outer end of the slot whereby the sector is more moved toward the driving shaft as the pin 6 goes toward the inner end of the slot. This starts movement for storing the associated wiper element. In this way, that wiper element is brought into a position shown at righthand dot-and-dash line in FIG. 1c. The pair of the wiper elements is stored in partially or completely superposed relationship.

As just above described, the toothed sector 15 is moved a greater distance during storing operation than during normal driving operation. Thereby its projection 28 is moved from its position shown at dot-and-dash line in FIG. 3 to the position shown in FIG. 2 to open the contacts 29 at the end of storing movement. It is to be understood from the electric circuit shown in FIG. 2 that the motor circuit is opened together with the circuit for the magnet coil 23 opened. Thus the wiper drive device becomes automatically inoperative by storing operation.

As shown in FIG. 2, the relatively pointed end portion of the cam plate 18 is inclined in such way as to trap or catch the end of the control lever 19. For this reason, the control lever 19 can not return back to its position shown at dot-and-dash line in FIG. 2. In other words, once the control lever 19 has been brought into the position shown at full line in FIG. 2 the same is maintained in that state even in the case of deenergizing the magnet coil 23. This is effective to protect the toothed sector 15 against one rocking movement which may be effected if the control lever 19 would be moved to its position shown at dot-and-dash line in FIG. 2 by the action of spring 20 for any reason. This movement of the lever 19 permits the cam plate 18 to be freely moved and accordingly to move the toothed plate 15 away from the driving shaft 1 by movement of the lever 7 in the direction of the driving shaft by the action of any external force. Such movement of the sector can close the contacts 29 resulting in rocking of the same.

It will be appreciated that, in the manner thus far described, the wiper device is put in the condition shown at full line in FIG. 2 with the pair of wiper elements in their stored position shown in FIG. 1d.

While the invention has been described in conjunction with the specific embodiment thereof it is to be understood that numerous variations and modifications may be made within the spirit and scope of the invention.

What we claim is:
1. In a system for driving wipers for a vehicle, the combination of a cam member, a first operating member operatively coupled to one of a pair of wiper element a second operating member operatively coupled to the other wiper element, all said members being superposed on each other and capable of being rocked about a common axis, a pin member engaging an elongated slot provided in each of said cam member and said first and second operating members, and driving means for effecting reciprocal movement of said pin within said slots, said cam member cooperating with both said slots and said pin member to bring said pair of wiper elements to respective starting positions to rocking the same within predetermined limits and to stop the wiper elements to respective stored positions in partially or completely superposed relationship after the wiper elements have been brought into their positions corresponding to the starting positions respectively, one of said operating members including an element operable to energize and deenergize said driving means.

2. In a system as claimed in claim 1, the provision of holding means for holding said cam member in predetermined positions.

References Cited in the file of this patent
UNITED STATES PATENTS
2,825,919    Horton _____ Mar. 11, 1958
FOREIGN PATENTS
812,034    Germany _____ Aug. 27, 1951